Jan. 4, 1966
A. SUTARUK
3,227,254
FLUID COUPLING
Filed July 25, 1962
2 Sheets-Sheet 1
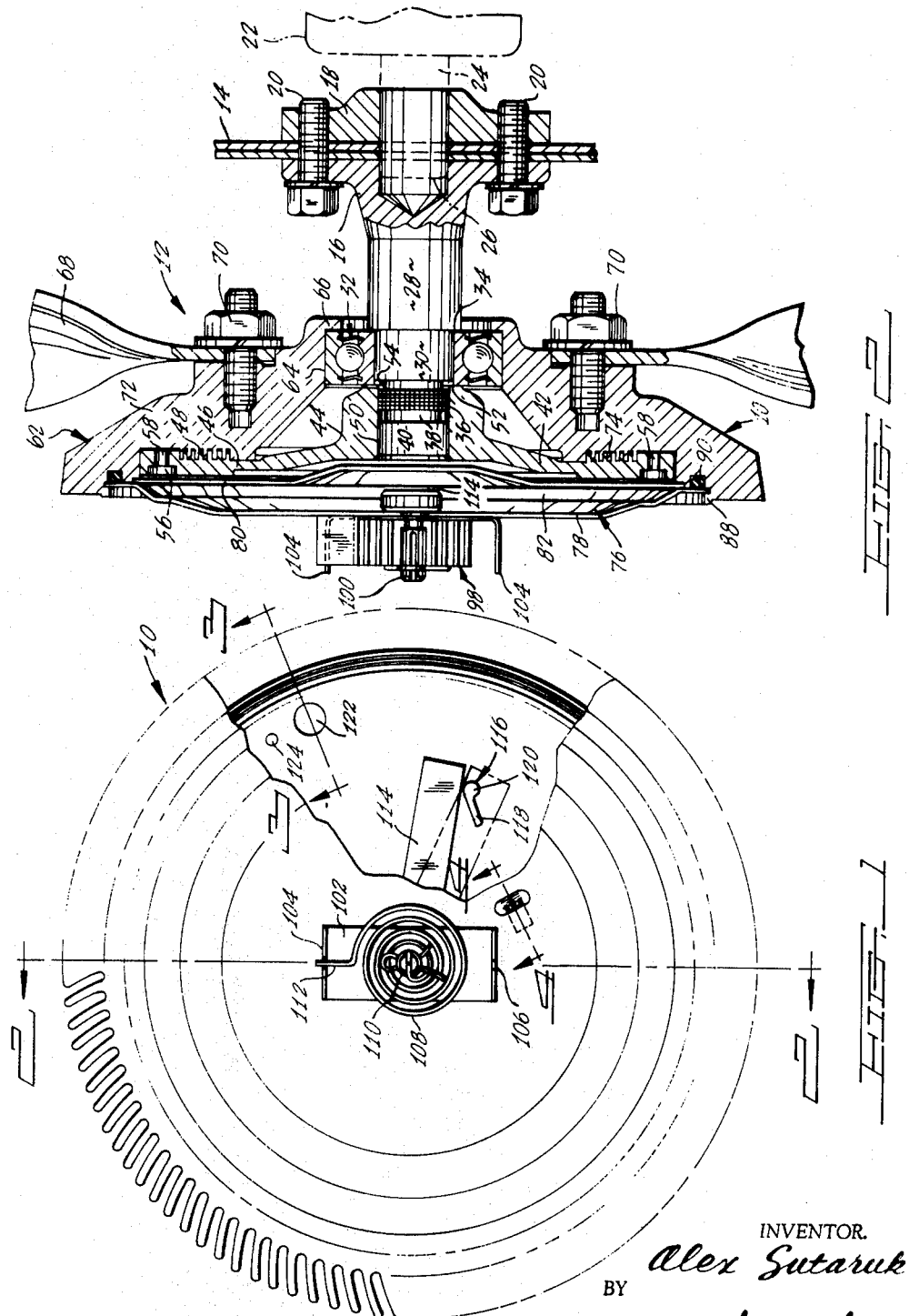
INVENTOR.
Alex Sutaruk
BY
Teague, Stover & Sadler
Attorneys

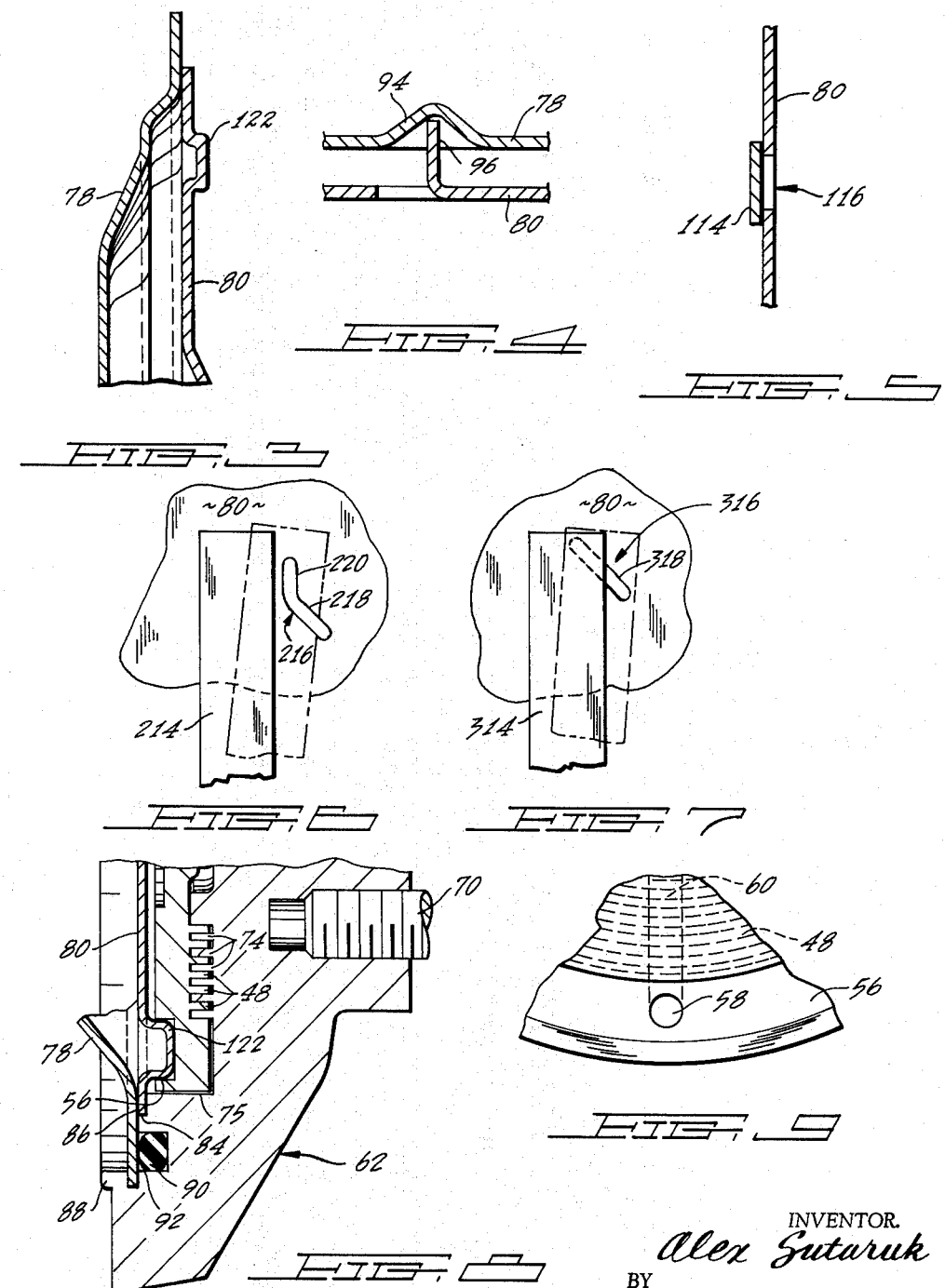

United States Patent Office 3,227,254
Patented Jan. 4, 1966

3,227,254
FLUID COUPLING
Alex Sutaruk, Hazel Park, Mich., assignor to Eaton Manufacturing Company, Cleveland, Ohio, a corporation of Ohio
Filed July 25, 1962, Ser. No. 212,222
7 Claims. (Cl. 192—58)

This invention relates to a viscous shear power transmitting mechanism, and more specifically, to a controlled mechanism in which the power transmitted from the driving member to the driven member is controllable through the operation of a temperature controlled operating means. This device is disclosed in the specific embodiment of a vehicle cooling fan wherein the fan functions as a selectively operable means responsive to the cooling requirements of the engine but it is understood that the structure disclosed herein is operable in other functional applications without departure from the scope of the instant invention.

Vehicle cooling fans are generally belt driven from the engine crankshaft, and are operable at a fixed speed ratio with respect to the vehicle engine. It has been found desirable to increase the speed ratio of the fan with respect to the engine speed so that at low engine r.p.m., the fan will be running at a relatively high speed for maximum cooling and as the speed of the engine increases, such as when the vehicle is running in direct drive at road speeds, the ram air cooling effect on the radiator engine is increased and the necessity for fan cooling is diminished.

The device disclosed herein relates specifically to an engine cooling fan mechanism wherein a viscous fluid shear type clutch is utilized to transmit power from the vehicle engine to the fan blade assembly in conjunction with means to regulate the amount of fluid in the fluid operating chamber and thereby control the fan speed by controlling the effectiveness of the viscous clutch.

It is an object of this invention to provide a new and novel means for regulating the volume of fluid in an operating chamber of a shear coupling to thereby control the power transmitted from the driving member to the driven member.

A further object is to regulate the volume of fluid in the operating chamber by a means which is operatively responsive to the temperature of the air surrounding the fluid coupling.

Another object is to provide an opening to allow fluid to flow from the storage to the operating chamber and means to vary the effective radial distance of the opening from the axis of rotation of the clutch assembly.

These and other objects and advantages of the invention will appear from the following description taken with the drawings forming a part of the specification and in which:

FIGURE 1 is a partial plan cut-away of the viscous clutch assembly.

FIGURE 2 is a partial section taken on 2—2 of FIGURE 1.

FIGURE 3 is a cross-sectional view taken on 3—3 of FIGURE 1 showing a portion of the cover plate, valve plate and impact pump.

FIGURE 4 is an enlarged view of the locking structure between the cover plate and the valve plate.

FIGURE 5 is a cross-sectional view of the valve arm and valve plate.

FIGURE 6 is a modification of the valve assembly.

FIGURE 7 is another modification of the valve assembly.

FIGURE 8 is an enlarged view of a portion of the structure shown in FIGURE 2.

FIGURE 9 is a plan view of a portion of the structure shown in FIGURE 8.

This invention is comprised of an engine supported pulley or sheave which is fixed for rotation with a coupling input shaft and supported on the engine.

The pulley is adapted to be driven preferably by a belt from the vehicle crankshaft. The coupling input shaft is fixed for rotation with a driving clutch or coupling member and a coupling housing member is mounted for rotation on the input shaft by suitable bearing means. The coupling housing member substantially encloses the driving clutch or coupling member and is adapted to be driven by the driving clutch member through the shear of viscous fluid disposed in the housing. A combination cover and fluid storage assembly means is fixed for rotation with the housing member and is formed by spaced plate portions which define a fluid storage chamber axially adjacent the shear surfaces on the driving clutch member and the coupling body member, respectively.

A valve structure for controlling the flow of fluid from the storage or reservoir chamber to the operating chamber is comprised of an inlet opening disposed or formed in the valve plate and a thermostatically operated valve arm which is selectively movable to various positions to complete cover, partially or completely uncover the valve inlet opening. This invention is directed particularly to the disposition and configuration of the inlet valve opening so that the volume of fluid admitted to the operating chamber is controlled to thereby effect regulation of the power transmitting effectiveness of the viscous coupling or clutch.

A thermostatic means is mounted on the cover plate for positioning the aforementioned valve arm with respect to the inlet opening. A discharge valve means or opening is disposed or formed in the valve plate and cooperates with a pumping means to evacuate fluid from the operating chamber to the storage chamber.

Referring to the drawing for a more detailed description of this device, FIGURE 1 discloses an engine accessory comprising a shear coupling or clutch means 10, an impact driving structure 12 which includes a pulley 14 connected to a shaft flange portion 16 and a companion hub plate 18 by bolts 20. Engine block supported member 22 has connected thereto a stub mounting shaft 24 which is mounted by a force or press fit integral with companion plate 18. As shown, the unsupported end of stub mounting shaft 24 extends into an annular opening 26 in the shaft flange portion 16 and shaft 24 is free to rotate relative to member 22. Pulley 14 is suitably driven by a belt from the vehicle engine (not shown) so that when the engine is in operation, the pulley functions as a driving input means for the engine accessory fluid coupling means 10.

The coupling means 10 is comprised of a driving shaft means 28 integral with shaft flange portion 16. Referring to FIGURE 2, shaft 28 is provided with a reduced intermediate portion 30 which functions as an inner race supporting means for ball bearing assembly 32. A shoulder 34 formed on shaft 28 restrains ball bearing 32 in one axial direction. A further shaft portion 36 is provided with surface serrations and a reduced diameter shaft portion 38 connects a further shaft portion 40 to the aforementioned portion of shaft 28.

A coupling member or clutch driving member 42 is provided with a hub portion 44 and a flange or plate portion 46 having a plurality of concentric, annular coupling lands 48 formed on the back side of flange portion 46. Hub portion 44 is provided with a straight wall hub opening 50 which has an interference fit with shaft portion 40 and knurled portion 36 so that when hub portion 44 is pressed or forced on the shaft portions 36 and 40, driving clutch member 42 will rotate with and be axially retained on shaft means 28. Hub portion 44 is pressed onto the shaft and bearing assembly until thrust surface portion 52 of the hub portion 44 abuts the inner race of bearing assembly 32 to axially confine the bearing assembly in the other direction of axail movement. Shaft 28 is undercut at 54 to insure abutment between thrust surface 52 of hub 44 and the end surface of the inner race of bearing assembly 32.

Driving clutch member 42 is provided with an annular recess 56 formed in a face of plate portion 46 on the side opposite annular lands 48. A pair of diametrically opposed, axially directed holes 58 are disposed slightly radially outward of annular lands 48 and terminate in annular recess 56. Annular lands 48 terminate or alternatively, are cut away in the form of a V notch to form a plurality of circumferentially spaced, radially directed channels or slots 60 which are circumferentially coincident with holes 58 and in communication therewith. The structure defines ducting or a fluid path commencing with the area adjacent annular lands 48, radial channels or slots 60, axially directed holes 58 and annular recess 56. The function of this structural arrangement will be hereinafter discussed more fully.

A coupling body or housing member 62 is comprised of a hub surface portion 64 which is supported on the lateral surface portion of the outer race of ball bearing assembly 32 and disposed in an intereference fit therewith. A lip or shoulder portion 66 reacts against an end surface of the outer race of bearing assembly 32 and limits or axially restrains housing member 62 in one axial direction. A plurality of fan blades 68 are secured at the shank portion of the blades by stud and nut assemblies 70 to intermediate body portion 72 of housing member 62.

A plurality of concentric annular lands 74 are disposed in an axial direction and formed integral with coupling body member 62 and, in assembly, are positioned in an axially overlapping relationship with annular coupling lands 48 of driving clutch member 42 so that the grooves disposed between the lands of one of the members receive the lands of the other member to form a fluid operating chamber between the lands. The aforementioned coupling grooves are disposed in a position so that when oil or other viscous fluid means, or more specifically, silicone oil is disposed between the lands 48 and 74, torque can be transmitted from one member to the other by fluid shear. It has been found satisfactory to provide a radial clearance between lands 48 and 74 in a range of about .005 to .010 inch. However, this clearance is not extremely critical and is a function of the inherent characteristics of the fluid which is utilized. Referring to FIGURES 2 and 4, the peripheral surface of driving member 42 is slightly radially spaced from the adjacent wall surface of housing member 62 at 75. During operation, housing member 62 is supported by bearing assembly 32 and fluid in the operating chamber and space 75, as disclosed in U.S. Patent No. 2,948,268.

A combination cover and fluid storage assembly means 76 is comprised of an exterior or cover plate 78 and a valve or pump plate 80 disposed axially intermediately cover plate 78 in coupling member 42. Cover plate 78 and valve plate 80 cooperate to define a fluid storage chamber 82. Valve plate 80 is receivable in an annular notched recess 84 provided in coupling body member 62 to laterally confine the valve plate. Cover plate 78 abuts the periphery of valve plate 80 along an annular surface 86 and thus valve plate 80 is axially confined in both directions and restrained laterally by annular notched recess 84. The peripheral portion of cover plate 78 is fixed integrally with coupling body member 62 by an annular spun-over portion 88. The cover plate could otherwise be retained in position with respect to coupling body member 62 by staking or by snap ring located at the illustrated position of portion 88. An O-ring 90 disposed in an annular recess 92 functions to retain the coupling fluid within the operating assembly and to prevent any leakage of the fluid.

Referring to FIGURES 1 and 4, a dimple or recessed portion 94 is formed in cover plate 78 in a shape to receive a locking tab 96 which is formed from an outturned portion of valve plate 80 and receivable in dimple 94 to lock cover plate 78 from relative rotation with respect to valve plate 80.

Referring to FIGURES 2 and 5, a valve and valve control assembly 98 is comprised of a valve arm mounting shaft 100 which is supported in cover plate 78 for relative rotation with respect to the cover plate and in fluid sealing relationship thereto.

A thermostat mounting clip 102 is attached to cover plate 78 by spot welds or resistance welds. Out-turned flanges 104 form an integral part of mounting clip 102 and are provided with central notches 106.

A helically wound bi-metallic thermostatic element 108 is provided with an in-turned end portion 110 which is receivable in a transverse slot disposed in shaft 100. An out-turned end portion 112 is selectively receivable in either of slots 106 formed in flanges 104. A valve arm 114 is mounted on the inward end of shaft 100 and is disposed adjacent valve plate 80. With this arrangement, a change in ambient temperature results in rotation of shaft 100 and valve arm 114.

The structure heretofore described and impact pump structure to be hereinafter described is disclosed and shown in Sidney Oldberg et al., U.S. Patent Application Serial No. 812,479, filed May 11, 1959, now U.S. Patent No. 3,055,473 entitled, "Fluid Coupling Device," and forms only an environmental portion of the instant improvement. The structure to be hereinafter described comprises the novel improvement and relates generally to means for regulating the volume of fluid in the operating chamber during operation of the device.

A fluid inlet opening means 116 is formed in valve plate 80 to allow the flow of fluid from the storage or reservoir chamber to the operating chamber. Referring to FIGURE 1, the specific fluid inlet opening means illustrated is comprised of a radially inner portion 118 and an enlarged radially outer portion 120. Fluid inlet means 116 is cooperatively disposed with valve arm 114 such that when valve arm 114 is rotated by operation of the bi-metallic thermostatic element 110, opening means 116 is either completely covered, partially covered, or completely uncovered, depending upon the actuated position of the thermostatic element. It is important to note that the fluid inlet opening means 116 has a substantial radial dimension so that circular movement of valve arm 114 changes the effective distance from the center of rotation of the coupling to the outermost portion of fluid inlet opening means 116 as the valve arm 114 is rotated.

An impact pump means 122 is also formed in valve plate 80 and in the embodiment shown in FIGURES 1, 3 and 8, the pumping element is drawn or formed in the shape of a projecting circular portion. In assembly, the pumping element is disposed in the annular pumping recess 56. Control of the efficiency of the pump may be effected by controlling the clearances between the pumping element 122 and the side and bottom wall surfaces of annular pumping recess 56. With this arrangement, during relative rotation of driving member 42 and pump plate 80, a positive pressure is created ahead of the pumping element 122 in recess 56.

A fluid discharge opening means 124 is formed in pump plate 80 and is positioned ahead of impact pump element 122 in the direction of rotation of valve plate 80. Fluid discharge opening means 124 is positioned radially between the inner and outer wall portions of annular pumping recess 56. With this arrangement, creation of a positive pressure ahead of impact pumping element 122 results in fluid being pumped under pressure from the operating chamber to storage chamber 82 through fluid discharge opening means 124.

A typical operating cycle of the device is set forth as follows. When the vehicle engine is in operation, pulley 14 is driven at an appropriate speed ratio, preferably a stepped-up ratio with respect to the speed of the vehicle engine and shaft 28, along with coupling input member 42, is driven at the same speed.

The initial position of valve arm 114 with respect to fluid inlet opening means 116 is determined by the ambient temperature. When the engine is cold, valve arm 114 is closed, thus preventing flow of fluid from the storage chamber 82 to the operating chamber. Since fluid discharge opening means 124 is always open, impact pumping means 122 rotates relative to driving clutch member 42 thus creating a positive pressure ahead of the impact pump and positively pumping fluid from the operating chamber to the storage chamber. This results in substantial evacuation of the operating chamber and low r.p.m. of the fan with respect to the speed of the clutch input. As the ambient temperature increases due to warm-up of the engine, valve arm 114 is rotated due to the action of thermostatic operator 108 and commences uncovering fluid inlet opening means 116. When inlet opening means 116 is opened slightly or at the radially inward portion 118, fluid is centrifuged from the storage chamber to the operating chamber through opening 118. As the fluid is admitted to the operating chamber, the slip speed decreases and the impact pump continues to pump fluid from the operating chamber back to the storage chamber. However, discharge opening 124 is restricted in size with respect to the inlet opening area and as long as the thermostatic operator does not move to a new position, the fluid level reaches a point of equilibrium in the respective chambers. It is noted that fluid inlet opening means 116 operates on a weir principle such that the fluid which is centrifuged radially outward of the fluid inlet opening cannot be transposed from the storage chamber to the operating chamber and only the volume of fluid which is disposed radially coincident with and inward of inlet opening means 116 is transposed from the storage chamber to the operating chamber. As the ambient temperature increases, cooling requirements are increased thus effecting operation of the thermostatic operator and further movement of valve arm 114 in a direction to increase the opening of fluid inlet opening 116.

As the valve arm 114 moves in this direction, the effective distance between the outermost uncovered portion of means 116 and the axis of rotation of the clutch assembly is increased. In effect, the torical volume of fluid disposed radially outward of the outermost portion of means 116 is decreased thus increasing the volume of fluid which is transposed to the operating chamber. As valve arm 114 moves to a position to uncover a greater portion of inlet opening means 116, the number of working lands in the operating chamber is increased and the slip speed of the coupling is decreased. When cooling requirements are at a maximum, the valve arm 114 completely uncovers fluid inlet opening means 116 and thus the coupling is operating at minimum slip speed and effects a maximum cooling function.

FIGURE 6 illustrates a modification of the fluid inlet opening means and it is comprised of a fluid opening means 216 which includes a radially inner portion 218 and a radially outer portion 220. With this structural arrangement, the area of the opening is increased at a fairly constant rate as portion 218 is uncovered. Further movement of valve arm 214 rapidly increases the rate of opening so that the slip speed will decrease at a greater rate through the lateral movement of valve arm 214 as compared to a slower rate of slip speed change during the initial movement of valve arm 214 as portion 218 is uncovered.

FIGURE 7 illustrates a further modification of a fluid inlet means and is comprised of an opening 316 having a substantially straight line portion 318. With this arrangement, as valve arm 314 is moved in an uncovering direction, the slip speed decreases at a fairly constant rate.

While the present invention has been described in connection with certain specific embodiments, it is to be understood that the foregoing description is merely exemplary and that the concept of this invention is susceptible of numerous other modifications, variations and applications which will be apparent to persons skilled in the art.

We claim:

1. In a rotatable torque transmitting device;
an input member;
an output member encompassing said input member and being supported thereon;
a fluid operating chamber formed between said members;
plate means cooperating with one of said members to form a fluid storage chamber therebetween;
fluid means disposed in said storage chamber and adapted to be transferred to said operating chamber;
pumping means including means forming a discharge opening between said operating chamber and said storage chamber to pump fluid from said operating chamber to said storage chamber;
the improvement comprising valve means including an inlet opening operatively associated with said plate means to permit the flow of fluid from said storage chamber to said operating chamber, said inlet means being disposed radially inward of said discharge opening;
and a movable valve element cooperatively disposed with said fluid inlet means to increase the distance of the effective position of the said inlet opening from the axis of rotation of said members.

2. In a rotatable torque transmitting device;
an input member;
an output member encompassing said input member;
a fluid operating chamber formed between said members;
a fluid storage chamber disposed adjacent said operating chamber;
fluid means disposed in said chambers and being transferable therebetween;
pumping means including means forming a discharge opening between said operating chamber and said storage chamber to pump fluid from said operating chamber to said storage chamber;
valve means including means forming an inlet opening between said storage chamber and said operating chamber to permit fluid to flow from the storage chamber to the operating chamber;
at least a portion of said means forming said inlet opening being disposed radially inward of said pumping means;
and a movable valve arm being movable at an angle with respect to at least a portion of said means forming said inlet opening so that as said valve arm moves to uncover the inlet opening, the radial outer portion of the uncovered portion of the inlet opening increases in distance from the axis of rotation of said members.

3. In a fluid shear power transmitting device;
an input member;
an output member encompassing said input member and being adapted to be driven thereby;
a chamber assembly including a fluid operating chamber disposed between said members;
a fluid storage chamber means disposed adjacent said fluid operating chamber;
fluid means disposed in said chamber assembly and being adapted to be transmitted between said chambers;
fluid delivery means for transposing said fluid from said operating chamber to said storage chamber;
valve means operatively disposed on said chamber assembly for allowing fluid to be transmitted from said storage chamber to said operating chamber;

said valve means including means for increasing the effective radial distance of said valve means from the axis of rotation of said members.

4. A device according to claim 3 wherein said valve means includes port means, plate means movable to selectively cover at least a portion of said port means.

5. A device according to claim 4 wherein a portion of said port means is disposed at an angle with respect to a radial line intersecting said portion.

6. A device according to claim 4 wherein said port means includes a first portion disposed at an angle with respect to a radial line intersecting said portion, a second portion disposed radially outward of said first portion and being positioned substantially parallel to a radial line bisecting said second portion.

7. A device according to claim 4 wherein said port means includes a first portion disposed at an angle with respect to a radial line intersecting said portion, a second portion disposed radially outward of said first portion and having a greater linear dimension measured along the operative edge of said plate means than any part of said first portion measured along the operative edge of said plate means.

References Cited by the Examiner
UNITED STATES PATENTS

| | | | |
|---|---|---|---|
| 3,055,473 | 9/1962 | Oldberg et al. | 123—41.12 |
| 3,159,254 | 12/1964 | Weir | 192—58 |

DON A. WAITE, *Primary Examiner.*

DAVID J. WILLIAMOWSKY, *Examiner.*